(12) United States Patent
Kolze

(10) Patent No.: US 8,724,646 B2
(45) Date of Patent: May 13, 2014

(54) SYSTEMS AND METHODS TO TRANSMIT INFORMATION AMONG A PLURALITY OF PHYSICAL UPSTREAM CHANNELS

(71) Applicant: Thomas J. Kolze, Phoenix, AZ (US)

(72) Inventor: Thomas J. Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/717,611

(22) Filed: Dec. 17, 2012

(65) Prior Publication Data

US 2013/0136142 A1 May 30, 2013

Related U.S. Application Data

(63) Continuation of application No. 11/498,092, filed on Aug. 3, 2006, now Pat. No. 8,335,226.

(60) Provisional application No. 60/704,898, filed on Aug. 3, 2005.

(51) Int. Cl.
  *H04L 12/28* (2006.01)
  *H04W 52/26* (2009.01)
  *H04W 52/34* (2009.01)

(52) U.S. Cl.
  CPC .......... *H04W 52/267* (2013.01); *H04W 52/262* (2013.01); *H04W 52/34* (2013.01)
  USPC ........................................... 370/431

(58) Field of Classification Search
  CPC .................................................. H04W 52/267
  USPC ........................................... 370/431
  See application file for complete search history.

(56) References Cited

U.S. PATENT DOCUMENTS

| 7,751,338 B2* | 7/2010 | Azenko et al. ................. 370/252 |
| 2004/0068748 A1* | 4/2004 | Currivan et al. ............... 725/111 |
| 2006/0104379 A1* | 5/2006 | Li et al. .......................... 375/267 |

* cited by examiner

*Primary Examiner* — Mark Rinehart
*Assistant Examiner* — Maharishi Khirodhar
(74) *Attorney, Agent, or Firm* — Garlick & Markison; Shayne X. Short

(57) ABSTRACT

A communication system includes a supervisory node (e.g., a headend) and one or more remote nodes (e.g., cable modems). The supervisory node or a remote node monitors a characteristic associated with the communication system. Remote node transmits an upstream communication among a plurality of physical upstream channels based on the characteristic. The average transmit power used to transmit the upstream communication among the plurality of physical upstream channels is no greater than the average transmit power that would be necessary to transmit the upstream communication using a single physical upstream channel at a lower data rate.

20 Claims, 13 Drawing Sheets

2 Channels @ 6.4 MHz each
Modulation = 16 QAM
Data Rate = 40 Mbps
$P_{TOTAL} = 2*P_2 = \frac{1}{2} P_0$

SYSTEMS AND METHODS TO TRANSMIT INFORMATION AMONG A PLURALITY OF PHYSICAL UPSTREAM CHANNELS

CROSS REFERENCE TO RELATED PATENTS/PATENT APPLICATIONS

Continuation priority claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility patent application Ser. No. 11/498,092, entitled "Systems and methods to transmit information among a plurality of physical upstream channels,", filed Aug. 3, 2006, currently pending, and scheduled subsequently to be issued as U.S. Pat. No. 8,335,226 on Dec. 18, 2012 (as indicated in an ISSUE NOTIFICATION mailed from the USPTO on Nov. 28, 2012), which claims priority pursuant to 35 U.S.C. §119(e) to the following U.S. Provisional Patent Application which is hereby incorporated herein by reference in its entirety and made part of the present U.S. Utility Patent Application for all purposes:

1.1. U.S. Provisional Patent Application Ser. No. 60/704,898, entitled "High upstream data rate while conserving transmit power in multi-channel cable modem,", filed Aug. 3, 2005.

BACKGROUND OF THE INVENTION

1. Technical Field of the Invention

The present invention relates generally to communication systems, and more specifically to transmitting information among multiple physical upstream channels in a communication system.

2. Description of Related Art

Communication systems include nodes that are coupled to each other via channels. A channel need not necessarily have a physical structure. For instance, in many communication systems, a channel is defined by a carrier signal having a predetermined frequency. Communication systems often include at least one supervisory node and a plurality of remote nodes. Communications from a supervisory node to a remote node are referred to as downstream communications and are transferred via downstream channel(s). Communications from a remote node to a supervisory node are referred to as upstream communications and are transferred via upstream channel(s).

Additive white Gaussian noise (AWGN) is often used to simulate or approximate the noise that is associated with a channel. According to communications theory, channels operating in noise, such as AWGN, have theoretical capacity limits. For example, the maximum data rate ($R_{MAX}$) associated with a channel is limited by the average transmit power ($P_{AVE}$), the signal-to-noise ratio (SNR), the bandwidth for the channel, and the upstream modulation technique. For a signal that is modulated using digital symbols, the average transmit power and the modulation technique determine the maximum number of bits that may be transmitted per symbol. The SNR determines the minimum average transmit power that is necessary to distinguish the signal from the AWGN. The bandwidth determines the maximum number of symbols that may be transmitted per second. The maximum data rate of a channel may be represented as $R_{MAX}=X*Y$, where X is the maximum number of bits that may be transmitted per symbol via the channel, and Y is the maximum number of symbols that may be transmitted per second via the channel.

In general, increasing the average transmit power by 3 dB enables an additional bit of information per symbol to be transmitted for a given SNR, bandwidth, and modulation technique, thereby increasing the maximum data rate of the channel. However, increasing the average transmit power may not be desirable due to any of a variety of reasons, including but not limited to a) increased cost, b) lower reliability, c) increased noise in adjacent and/or other channels, d) battery lifetime, and e) power limitations of the communication system.

Accordingly, systems and methods are needed that address one or more of the aforementioned shortcomings of conventional communication systems and methods.

BRIEF DESCRIPTION OF THE SEVERAL VIEWS OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention.

In the drawings, like reference numbers indicate identical or functionally similar elements. Additionally, the leftmost digit(s) of a reference number identifies the drawing in which the reference number first appears.

DETAILED DESCRIPTION OF THE INVENTION

This specification discloses one or more embodiments that incorporate the features of this invention. The embodiment(s)

described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

1.0 Overview

Figure 1:
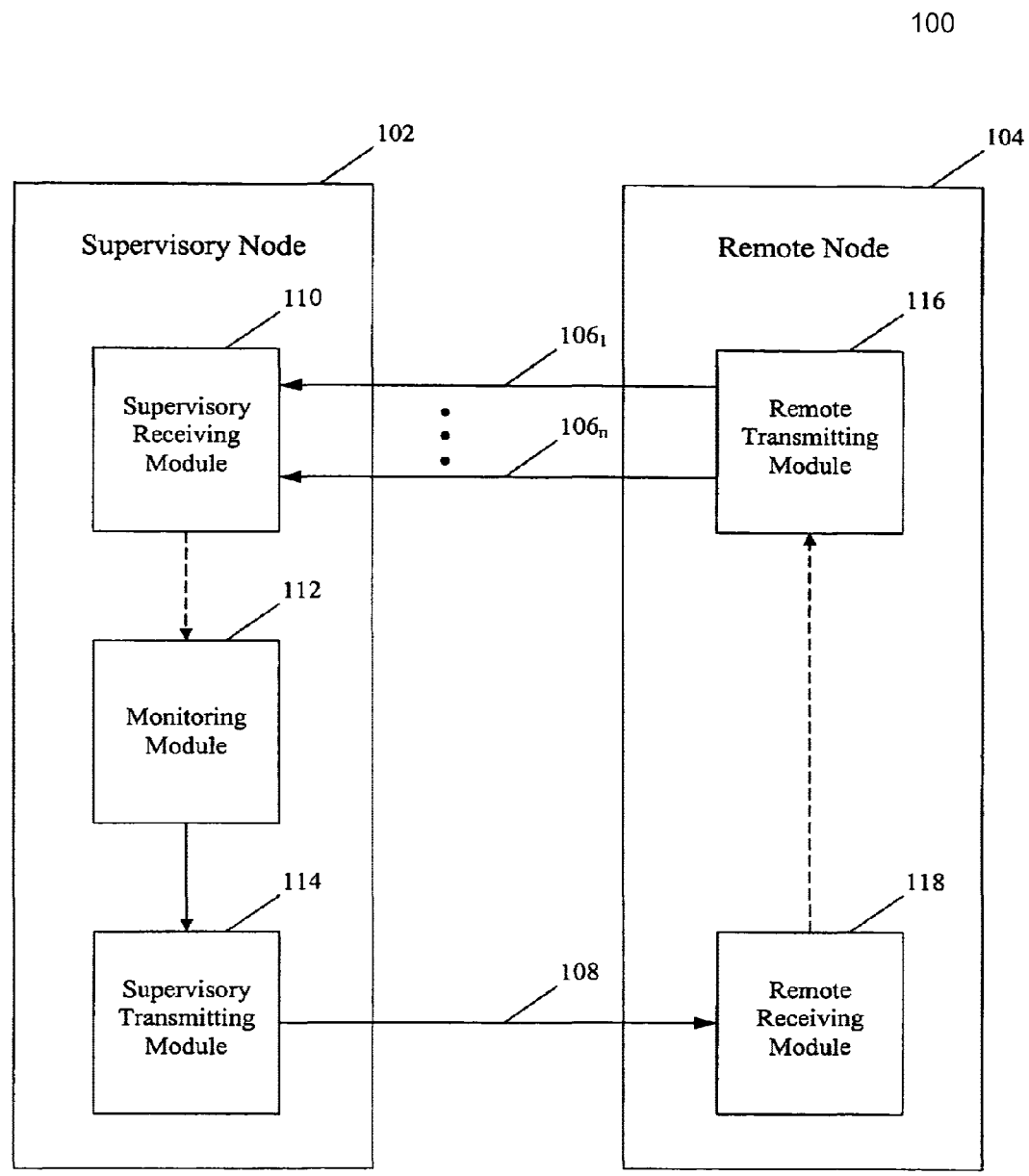
FIG. 1 illustrates a high-level block diagram of an example communication system according to an embodiment of the present invention.

FIG. 1 illustrates a high-level block diagram of an example communication system 100 according to an embodiment of the present invention. In FIG. 1, communication system 100 includes a supervisory node 102 and a remote node 104, which are connected via upstream channels $106_1$-$106_n$ and downstream channel(s) 108. Supervisory node 102 can be any of a variety of communication devices, including but not limited to a cable modem termination system (CMTS), a satellite, or a cellular base station. Remote node 104 can be any of a variety of communication devices, including but not limited to a cable modem, a settop box, a cable gateway, a portable computing device, or a cellular telephone.

Referring to FIG. 1, remote node 104 includes a remote transmitting module 116 and a remote receiving module 118. Remote transmitting module 116 transmits an upstream transmission to supervisory node 102 via upstream channels $106_1$-$106_n$. Remote receiving module 118 receives message(s) from supervisory node 102 via downstream channel(s) 108. The message(s) received by remote receiving module 118 determine the manner in which remote transmitting module 116 transmits a data sequence to supervisory node 102. A data sequence can be a singular data sequence or a plurality of data sequences.

Supervisory node 102 includes a supervisory receiving module 110, a monitoring module 112, and a supervisory transmitting module 114. Supervisory receiving module 110 receives the upstream transmission from remote transmitting module 116. Monitoring module 112 monitors a characteristic associated with communication system 100. For example, monitoring module 112 may monitor an aggregate upstream power or an aggregate upstream bandwidth of communication system 100. In another example, monitoring module 112 may monitor a signal-to-noise ratio (SNR), an error rate (e.g., packet, symbol, code word, pre-FEC, post-FEC, etc.), a data rate, or an average transmit power of the upstream transmission that supervisory receiving module 110 receives from remote node 104. Accordingly, in the embodiment of FIG. 1, monitoring module 112 is shown to be optionally coupled to supervisory receiving module 110. The characteristic monitored by monitoring module 112 may be based on any of a variety of factors, including but not limited to those mentioned above or a combination thereof.

Supervisory transmitting module 114 is configured to transmit a first downstream message to remote node 104 based on the characteristic that is monitored by monitoring module 112. For instance, supervisory transmitting module 114 may transmit the first downstream message in response to the characteristic reaching a first threshold. If the characteristic is based on a plurality of factors, then the first threshold may include a plurality of thresholds associated with respective factors. Threshold(s) of one or more factors may be dependent on the value(s) of other factor(s). For example, thresholds associated with first and second factors may be mutually dependent, meaning that the threshold of the first factor is dependent on the value of the second factor and the threshold of the second factor is dependent on the value of the first factor. The first threshold may be predetermined, though the scope of the present invention is not limited in this respect. As described above, the first threshold may be variable.

The first downstream message indicates the manner in which remote node 104 is to transmit a data sequence. For example, the message may indicate the number of upstream channels $106_1$-$106_n$ that remote transmitting module 116 is to use for transmitting the data sequence to supervisory node 102. In this example, remote transmitting module 116 is configured to transmit at least a first portion of the data sequence among N upstream channels $106_1$-$106_n$ at a cumulative first data rate using a cumulative first average transmit power based on the first downstream message. The cumulative first data rate is the sum of the data rates associated with the respective N upstream channels $106_1$-$106_n$. The cumulative first average transmit power is the sum of the average transmit powers associated with the respective N upstream channels $106_1$-$106_n$.

The cumulative first average transmit power is no greater than a second average transmit power that would be necessary to transmit the data sequence at a second data rate that is less than the cumulative first data rate using M upstream channels $106_1$-$106_n$, wherein N>M≥1. Accordingly, remote transmitting module 116 transmits at least the first portion of the data sequence at an average transmit power that is no greater than the average transmit power necessary to transmit the data sequence at a lower data rate using fewer upstream channels. In an aspect, configuring remote transmitting module 116 in this manner enables remote transmitting module 116 to transmit at least the first portion of the data sequence at a greater data rate without increasing the average transmit power.

According to an embodiment, supervisory transmitting module 114 is further configured to transmit a second downstream message based on the characteristic reaching a second threshold. In this embodiment, remote transmitting module 116 is further configured to transmit a second portion of the data sequence using M upstream channels $106_1$-$106_n$ at the second data rate using the second average transmit power based on the second downstream message. The first and second thresholds may be the same or different.

Persons skilled in the relevant art(s) will recognize that supervisory node 102 need not necessarily include monitoring module 112. For example, remote node 104 may include monitoring module 112.

Figure 2:
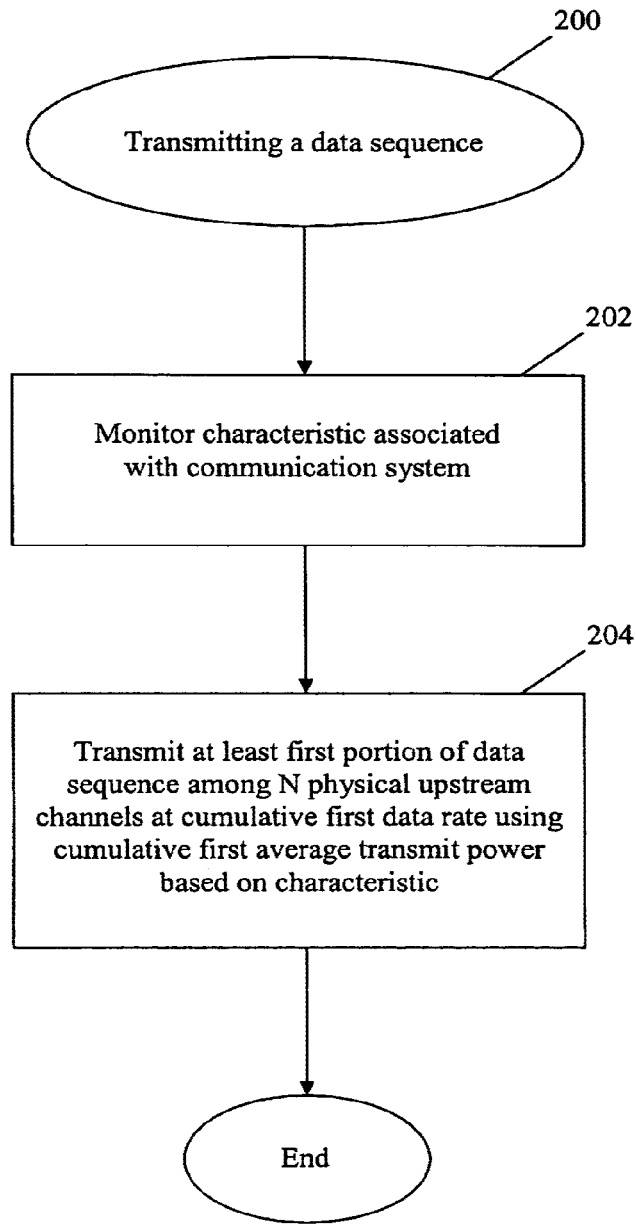
FIGS. 2 and 3 are flowcharts of methods of transmitting a data sequence in accordance with embodiments of the present invention.
Figure 3:
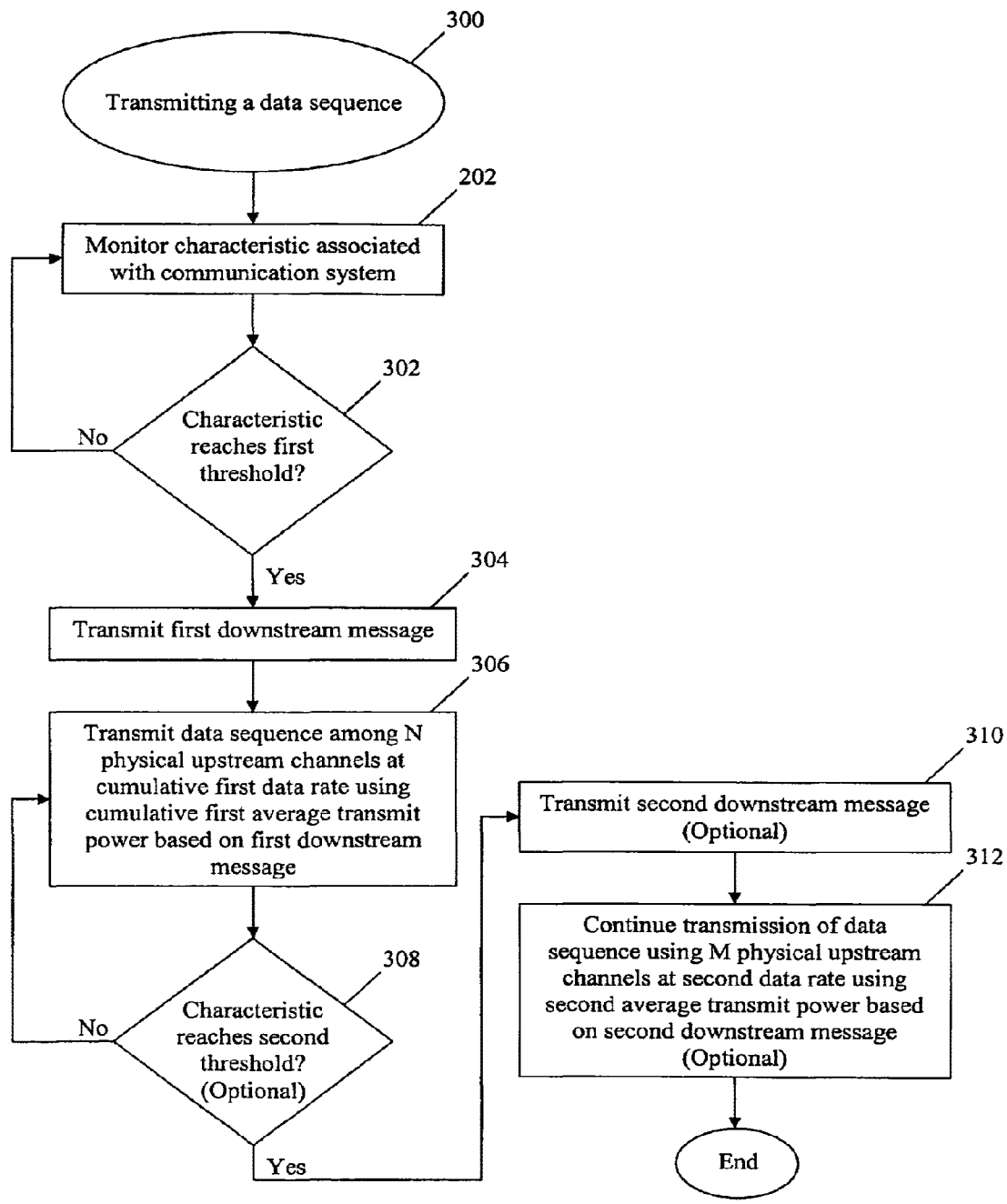

FIGS. 2 and 3 illustrate flowcharts 200 and 300 of methods of transmitting a data sequence in accordance with embodiments of the present invention. The invention, however, is not limited to the description provided by flowcharts 200 and 300. Rather, it will be apparent to persons skilled in the relevant art(s) from the teachings provided herein that other functional flows are within the scope and spirit of the present invention.

Flowcharts 200 and 300 will be described with continued reference to example communication system 100 described above in reference to FIG. 1, though the methods are not limited to that embodiment.

Referring now to FIG. 2, a characteristic associated with a communication system is monitored at block 202. For example, monitoring module 112 may monitor the characteristic. Persons skilled in the relevant art(s) will recognize that any of a variety of means may monitor the characteristic at block 202, including but not limited to a CMTS, a satellite, a cellular base station, or a component thereof.

At least a first portion of the data sequence is transmitted among N physical upstream channels at a cumulative first data rate using a cumulative first average transmit power based on the characteristic at block 204. The cumulative first average transmit power is less than or equal to a second average transmit power that is necessary to transmit the data sequence at a second data rate that is less than the cumulative first data rate using M physical upstream channels, wherein $N>M \geq 1$. For example, remote transmitting module 116 may transmit at least the first portion of the data sequence. Other exemplary means for transmitting at least the first portion of the data sequence include but are not limited to a cable modem, a settop box, a cable gateway, a portable computing device, a cellular telephone, or a component thereof.

At block 204, transmitting at least the first portion of the data sequence may be performed in accordance with a communication standard such as a Data Over Cable Service Interface Specification (DOCSIS™) standard, an Institute of Electrical and Electronics Engineers (IEEE) 802.11 standard, a cellular communication standard, etc. The operation at block 204 may be performed in response to the characteristic reaching a threshold, though the scope of the present invention is not limited in this respect.

Referring now to FIG. 3, a characteristic associated with a communication system is monitored at block 202. If the characteristic does not reach a first threshold, as determined at decision block 302, then the characteristic continues to be monitored at block 202. For instance, monitoring module 112 may perform the monitoring and determining operations at respective blocks 202 and 302. Changes, modifications, or adjustments to remote node 104 and/or some other remote node(s) may occur to adjust the monitored characteristic and/or the first threshold. For instance, an error rate, SNR, etc. may be monitored until a desired value is achieved. If the characteristic reaches the first threshold, as determined at block 302, then a first downstream message is transmitted at block 304. For example, supervisory transmitting module 114 may transmit the first downstream message. The first downstream message may be a data grant message, for example, granting permission for remote node to transmit the data sequence.

At least a first portion of the data sequence is transmitted among N physical upstream channels at a cumulative first data rate using a cumulative first average transmit power based on the first downstream message at block 306. The cumulative first average transmit power is less than or equal to a second average transmit power that is necessary to transmit the data sequence at a second data rate that is less than the cumulative first data rate using M physical upstream channels, wherein $N>M \geq 1$.

The method described herein with reference to flowchart 300 may optionally include the operations depicted by blocks 308, 310, and 312. The method need not necessarily include operations 308, 310, and 312. Referring to FIG. 3, if the characteristic does not reach a second threshold, as determined at decision block 308, then the data sequence continues to be transmitted among N physical upstream channels at block 306. For instance, monitoring module 112 may perform the determining operation at block 308. If the characteristic reaches the second threshold, as determined at block 308, then a second downstream message is transmitted at block 310. For example, supervisory transmitting module 114 or any of a variety of other means including but not limited to a CMTS, a satellite, a cellular base station, or a component thereof may transmit the second downstream message. The second downstream message is provided to change the manner in which the data sequence is transmitted upstream.

The data sequence continues transmission using M physical upstream channels at the second data rate using the second average transmit power based on the second downstream message at block 312. For example, remote transmitting module 116 or any of a variety of other means including but not limited to a cable modem, a settop box, a cable gateway, a portable computing device, a cellular telephone, or a component thereof may transmit the second downstream message.

2.0 Example Cable Modem System Embodiments

Although the embodiments of the invention described below with reference to FIGS. 4-11 refer specifically, and by way of example, to cable modem systems, including cable modem termination systems and cable modems, it will be readily apparent to persons skilled in the relevant art(s) that the invention is equally applicable to other communication systems, including but not limited to satellite systems, optical communications systems, telephone wire systems, wireless networking systems, cellular systems, and/or any combination thereof. In these embodiments, supervisory node 102 is shown to be a cable modem termination system (CMTS), and remote node 104 is shown to be a cable modem. However, such labeling is not intended to limit the scope of the invention. It will also be readily apparent to persons skilled in the relevant art(s) that the invention is applicable to any point-to-multipoint system.

A cable modem system typically includes a headend that is capable of communicating with multiple CPE, each of which provides cable modem functionality. The CPE may be a cable modem, a settop box, or a cable gateway, to provide some examples. The upstream of the cable modem system may consist of multiple channels that can be assigned to the multiple CPE. These channels are separated from each other by operating at different frequencies. The downstream traditionally consists of a single broadcast channel. However, embodiments of the present invention are applicable to cable modem systems (or any other communication system) having multiple downstream channels.

DOCSIS™ (Data Over Cable Service Interface Specification) refers to a group of specifications published by Cable-Labs® that define industry standards for cable headend and cable modem equipment. In part, DOCSIS™ sets forth requirements and objectives for various aspects of cable modem systems including operations support systems, management, data interfaces, as well as network layer, data link layer, and physical layer transport for data over cable systems. The current version of the DOCSIS™ specification is version 2.0, and includes the DOCSIS™ Radio Frequency Interface (RFI) Specification SP-RFIv2.0-I03-021218 (hereinafter "DOCSIS™ RFI Specification"), the entirety of which is incorporated by reference herein.

2.1 Example Cable Modem System

Figure 4:
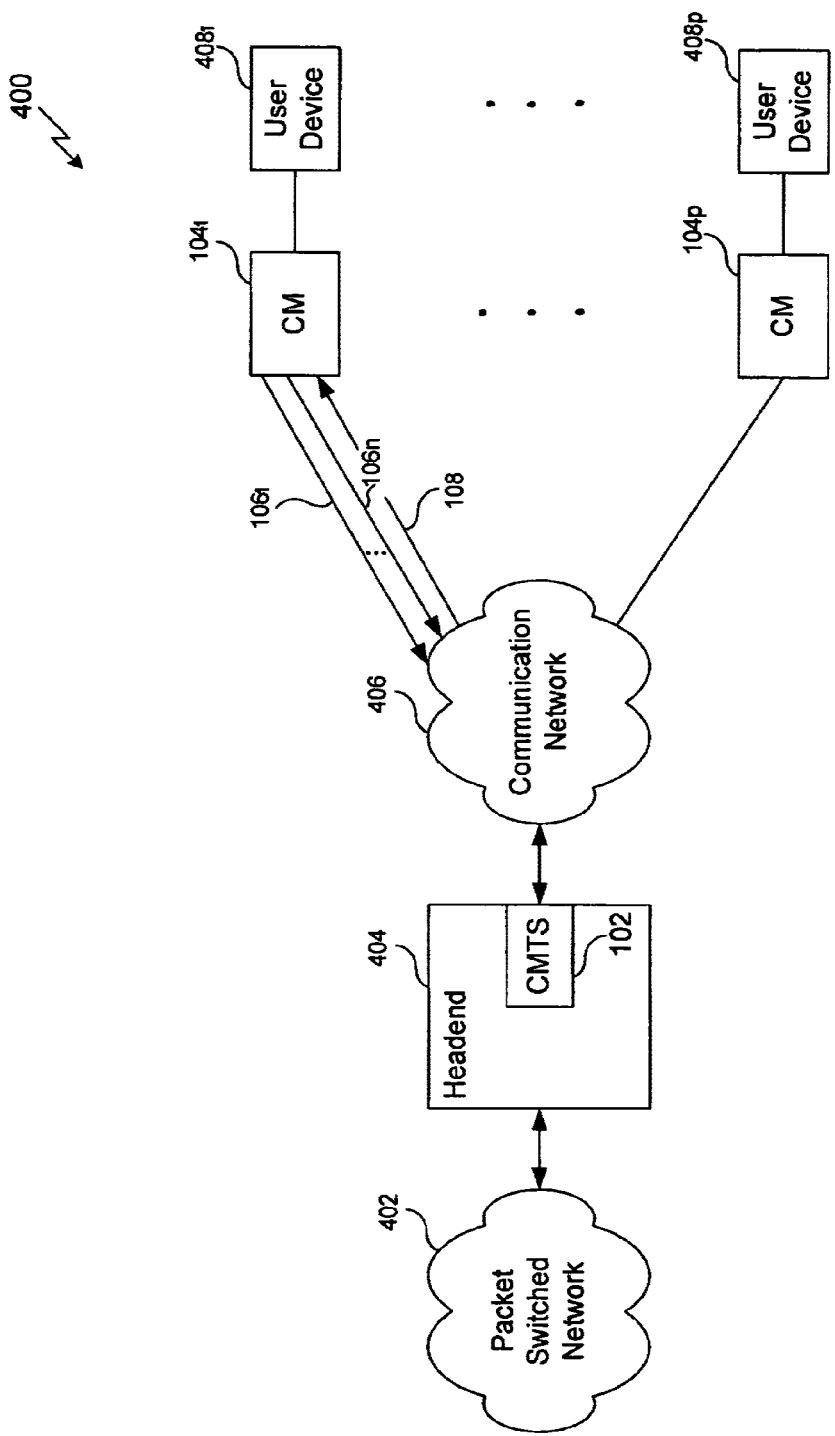
FIG. 4 illustrates a high-level block diagram of an example cable modem system according to an embodiment of the present invention.

FIG. 4 illustrates a high-level block diagram of an example cable modem system 400 according to an embodiment of the present invention. Cable modem system 400 enables voice communications, audio communications, data services, video, messaging, graphics, other forms of media and/or multimedia, or any combination thereof, based on a bi-directional transfer of packet-based traffic, such as Internet Protocol (IP) traffic.

Referring to FIG. 4, the bi-directional transfer of packet-based traffic occurs between a cable system headend 404 and a plurality of cable modems $104_1$-$104_p$ via a communication network 406, which, by way of example, may comprise a hybrid fiber coaxial (HFC) network. Communication network 406 may support wired, wireless, or both transmission media, including satellite, terrestrial (e.g., fiber optic, copper, twisted pair, coaxial, etc.), radio, microwave, free-space optics, and/or any other form or method of transmission. In an embodiment, communication network 406 includes frequency translation devices in support of a frequency stacking architecture.

Cable headend 404 generally includes at least one cable modem termination system (CMTS) 102. CMTS 102 is a portion of cable headend 404 that manages the upstream and downstream transfer of data between cable headend 404 and cable modems $104_1$-$104_p$, each of which may be located at respective customer premises. CMTS 102 broadcasts information downstream to cable modems $104_1$-$104_p$ as a continuous transmitted signal in accordance with a time division multiplexing (TDM) technique. The downstream signal may be formatted with a motion picture expert group (MPEG) transmission convergence sublayer, though the present invention is not limited in this respect. For instance, embodiments of the present invention may be configured to support other data formats as would be apparent to one skilled in the relevant art(s).

Additionally, CMTS 102 receives data from cable modems $104_1$-$104_p$ over a plurality of shared upstream channels. Data from cable modems $104_1$-$104_p$ is transmitted upstream in accordance with a time domain multiple access (TDMA) technique or a synchronous code division multiple access (S-CDMA) technique.

CMTS 102 establishes the upstream slot structure and allocates upstream bandwidth by sending, for example, an upstream channel descriptor (UCD) message and MAP messages, respectively, to cable modems $104_1$-$104_p$. CMTS 102 also uses the MAP messages and slot count values to anticipate burst arrivals from cable modems $104_1$-$104_p$. In an embodiment, the UCD and MAP messages are defined by the DOCSIS™ specification, originated by CableLabs®, which specifies the interface requirements for cable modem systems.

According to an embodiment, CMTS 102 connects to up to four adjacent, six mega-Hertz (MHz) carriers, each of which taken individually is a completely DOCSIS™2.0-compliant downstream. Carriers connected to CMTS 102 need not necessarily be adjacent. It should be understood that the quantity of carriers and the carrier specifications may vary as determined by the system architect. For example, a plurality of eight MHz carriers may be connected to CMTS 102 to conform with European standards.

As shown in FIG. 4, CMTS 102 further serves as an interface between communication network 406 and a packet switched network 402, transferring packets received from cable modems $104_1$-$104_p$ to packet switched network 402 and transferring packets received from packet switched network 402 to cable modems $104_1$-$104_p$ when appropriate.

Packet switched network 402 is part of a wired, wireless, or combination of wired and wireless local area networks (LANs), wide area networks (WANs), and/or optical networks (e.g., an organization's intranet, local internets, the global-based Internet (including the World Wide Web (WWW)), virtual private networks, and/or the like). CMTS 102 utilizes packet switched network 402 to communicate with another device or application external to cable modem system 400. The device or application may be a server, web browser, operating system, other types of information processing software (e.g., word processing, spreadsheets, financial management, or the like), television or radio transmitter, another cable modem 104, another CMTS 102, or the like.

In addition to CMTS 102, cable headend 404 may include one or more routers to facilitate the connection between CMTS 102 and packet switched network 402, as well as one or more servers for performing necessary network management tasks. Headend 404 may also include one or more satellite receivers, video modulators, and/or telephone switches, to provide other examples.

Each of cable modems $104_1$-$104_p$ operates as an interface between communication network 406 and a corresponding attached user device $408_1$-$408_p$. In particular, each cable modem $104_1$-$104_p$ converts downstream signals received over communication network 406 into IP data packets to be received by a corresponding attached user device $408_1$-$408_p$. Cable modems $104_1$-$104_p$ are configurable to transport one or more services to user devices $408_1$-$408_p$. The services may include but are not limited to telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), and/or the like.

Additionally, each cable modem $104_1$-$104_p$ converts IP or other suitable protocols (e.g., asynchronous transfer mode (ATM)) for packetized data received from a corresponding user device $408_1$-$408_p$ into upstream burst signals suitable for transfer over communication network 406. The upstream is divided into one or more upstream channels. Each upstream channel carries bursts of packets from cable modems $104_1$-$104_p$ to CMTS 102. In the upstream, each channel is broken into multiple assignable slots, and cable modems $104_1$-$104_p$ send a burst signal in an assigned slot. As discussed above, the slot structure is defined and assigned by CMTS 102.

CMTS 102 is capable of assigning upstream burst signals of a cable modem 104 to slots that are spread among a plurality of upstream channels, thereby enabling the cable modem 104 to transmit on multiple upstream channels simultaneously. The cable modem 104 transmits the upstream burst signals among the slots in accordance with the slot assignments provided by CMTS 102. This technique of bonding together smaller bandwidth upstream channels to create a larger bandwidth pipe is referred to herein as "channel bonding". Exemplary channel bonding techniques are described in U.S. patent application Ser. No. 11/298,446 (U.S. Pub. No. 2006/0126660), filed Dec. 12, 2005, which is incorporated herein by reference in its entirety.

Devices or equipment that are not capable of handling upstream channel bonding include, for example, "legacy upstream cable modems." As such, embodiments of the present invention may fully integrate the operation and/or management of legacy devices and devices that are capable of upstream channel bonding, both having the ability to communicate within the same communication system.

Referring to FIG. 4, each cable modem $104_1$-$104_p$ is shown supporting only a single user device for the sake of clarity. However, each cable modem $104_1$-$104_p$ is generally capable of supporting a plurality of user devices for communication over cable modem system 400. A user device may be a personal computer, data terminal equipment, telephony device, broadband media player, network controlled appliance, or any other device capable of transmitting or receiving data over a packet switched network.

According to an embodiment, CMTS 102 and cable modems $104_1$-$104_p$ are integrated to support protocols such as Internet Protocol (IP), Transmission Control Protocol (TCP), User Datagram Protocol (UDP), Real Time Transport Protocol (RTP), Resource Reservation Protocol (RSVP), etc.

In an embodiment, cable modems $104_1$-$104_p$ and CMTS 102 represent DOCSIST™-compliant cable modem equipment. In other words, cable modems $104_1$-$104_p$ and CMTS 102 are adapted to communicate in accordance with protocols and/or formats provided in the DOCSIS™ specification.

Figure 5:
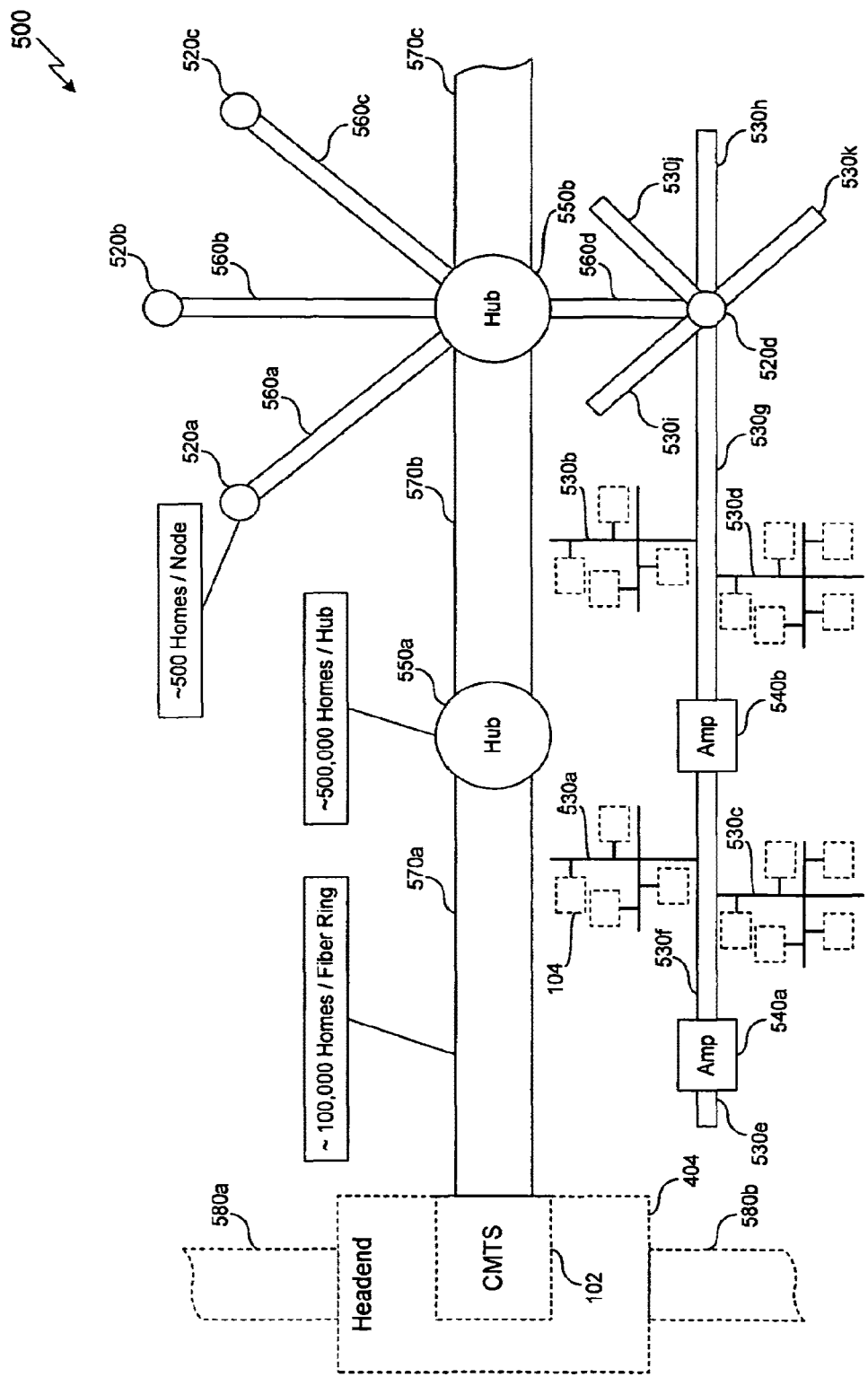
FIG. 5 illustrates a schematic diagram of an example hybrid fiber coaxial (HFC) network showing pathways for data transmissions between a headend and a plurality of cable modems according to an embodiment of the present invention.

FIG. 5 illustrates a schematic diagram of an example hybrid fiber coaxial (HFC) network 500 to facilitate transmission of data between headend 404 and cable modems $104_1$-$104_p$ according to an embodiment of the present invention. For example, communication network 406 is often used by a cable provider to provide Internet access, cable television, and/or pay-per-view programming to subscribers.

In FIG. 5, approximately 500 cable modems 104 are in electrical communication with each node 520 of communication network 406 for illustrative purposes. In the embodiment of FIG. 5, cable modems 104 are connected to a node 520 via coaxial cables 530. Communication network 406 includes amplifiers 540 to facilitate the electrical connection of the more distant cable modems 104, for example, to nodes 520. Amplifying the electrical signals may desirably enhance the signal-to-noise ratio (SNR) of communications between headend 404 and cable modems 104. Coaxial cables 530a-530d electrically connect cable modems 104 with coaxial cables 530f, 530g, which extend between amplifiers 540 and nodes 520.

Each node 520 is electrically connected to a hub 550, typically via an optical fiber 560. Hubs 550 are in communication with headend 404 via optical fibers 570. Each hub 550 is generally capable of facilitating communication with 20,000 cable modems 104.

Optical fibers 570 extending intermediate headend 404 and each hub 550 define a fiber ring, which is typically capable of facilitating communication between approximately 100,000 cable modems 104 and headend 404. Headend 404 may communicate via transmission line 580 with the Internet, another headend, and/or any other suitable device(s) or network. Transmission line 580 may be a T1 line or a T2 line, to provide some examples.

Figure 6:
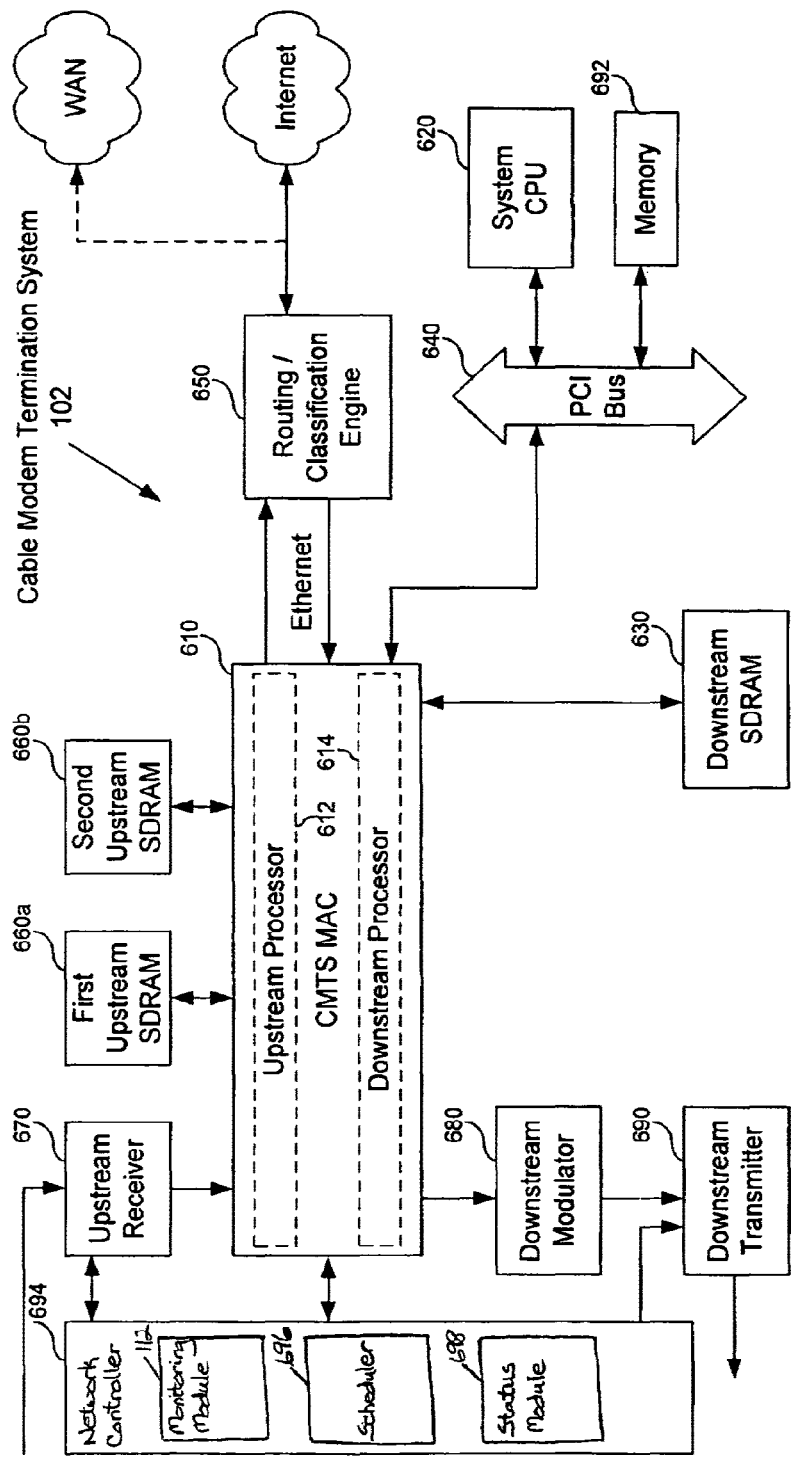
FIG. 6 illustrates a block diagram of an example implementation of the cable modem termination system (CMTS) shown in FIG. 4 according to an embodiment of the present invention.

FIG. 6 illustrates a block diagram of an exemplary implementation of CMTS 102 of cable modem system 400 according to an embodiment of the present invention. This exemplary implementation is presented by way of example, and is not intended to limit the scope of the present invention. CMTS 102 processes signals both at a physical (PHY) layer and at a media access control (MAC) layer. CMTS 102 includes a CMTS MAC 610, which provides hardware support for MAC layer per-packet functions, such as fragmentation, concatenation, payload header suppression/expansion, and/or error checking. Providing such support reduces the amount of processing required of a system central processing unit (CPU) 620, which serves to improve the overall performance of CMTS 102.

An upstream processor 612 of CMTS MAC 610 performs data encryption standard (DES) decryption, fragment reassembly, de-concatenation, payload packet expansion, packet acceleration, upstream management information base (MIB) statistic gathering, and/or priority queuing for the resultant packets. Each output queue is independently configured to provide packets to a peripheral component interconnect (PCI) or a gigabit media independent interface (GMII) (not shown).

A downstream processor 614 of CMTS MAC 610 accepts packets from priority queues and performs payload header suppression, DOCSIS™ header creation, DES encryption, cyclic redundancy checking (CRC), header check sequence creation in accordance with the DOCSIS™ specification, Moving Pictures Experts Group (MPEG) encapsulation, and/or multiplexing. In an embodiment, a downstream synchronous dynamic random access memory SDRAM 630 is used to support packaging, handling, and storage of output queues received from CMTS MAC 610.

A memory 692 may interact with CMTS MAC 610 to store signals as they are processed by CMTS MAC 610. Memory 692 may also store various auxiliary data used to support processing activities of CMTS MAC 610. Such auxiliary data may include but is not limited to security protocols, identifiers, rules, policies, or the like, as described in greater detail below.

According to an embodiment, memory 692 stores a software application to operate on one or more processors or hardware assist devices, such as a field-programmable gate array (FPGA) or an application-specific integrated circuit (ASIC). For instance, the one or more processors may use the software application to process control messages, voice, and/or data received from CMTS MAC 610. In an embodiment, the software application includes a classifier/router and a bandwidth (BW) allocation controller. The BW allocation controller manages upstream and/or downstream modulation and bandwidth allocation. The classifier/router provides rules and policies for classifying and/or prioritizing communications with cable modems 104. The classifier/router also routes signals from cable modems 104 to a destined location over packet switched network 402.

In an embodiment, CMTS MAC 610 is configured and managed externally via a PCI interface (not shown) and a PCI bus 640. Alternatively, CMTS MAC 610 may be operated remotely using a routing/classification engine 650 that is located externally to CMTS MAC 610.

According to an embodiment, first and second upstream SDRAMs 660 are used to minimize latency on the internal buses of CMTS 102. For example, in an embodiment, first upstream SDRAM 660a is operable to support keys and reassembly, and second upstream SDRAM 660b is operable to support packet header suppression (PHS) and output queues.

A Serial Peripheral Interface (SPI) master port (not shown) is employed to control the interface between MAC layer components and PHY layer components. For example, the SPI master port may be used to control the interface between the CMTS MAC 610 and the upstream receiver 670 and/or between the CMTS MAC 610 and downstream modulator 680.

CMTS MAC 610 generates data which is modulated and then transmitted to one or more cable modems 104. For example, data generated by CMTS MAC 610 is modulated onto a carrier signal by downstream modulator 680 and then transmitted downstream by downstream transmitter 690. Upstream receiver 670 receives information from cable modems 104 in bursts of TDMA- or S-CDMA-encoded packets.

Network controller 694 configures upstream receiver 670 for a bandwidth and informs upstream receiver 670 of the nominal power of communications that are to be received at upstream receiver 670, unless upstream receiver 670 is hardwired to know the nominal power.

In the embodiment of FIG. 6, network controller 694 includes scheduler 696, status module 698, and monitoring module 112. Monitoring module 112 monitors a characteristic associated with upstream burst signals received at upstream receiver 670. Monitoring module 112 provides information regarding the characteristic to scheduler 696. CMTS MAC 610 provides to scheduler 696 a request for upstream capacity. Scheduler 696 determines the upstream grant, which includes upstream minislot assignments, channels, and burst profiles for upstream communications based on the information regarding the characteristic and the request for upstream capacity. Scheduler 696 provides the upstream grant information to CMTS MAC 610, which forwards the grant information to downstream modulator 680.

Upstream receiver 670 receives the grant information from CMTS MAC 610 or network controller 694, so that upstream receiver 670 is prepared to receive the upstream communications.

Downstream modulator 680 modulates the grant information onto a carrier signal, so that downstream transmitter 690 may transmit the resulting MAP message and/or UCD message to cable modem 104. Status module 698 stores information regarding the MAP messages and/or UCD message that are sent to cable modem 104. For example, this information may include burst profiles that have been provided to cable modem 104 regarding the upstream channels, user-unique power levels sent to cable modem 104, and/or user-unique frequency assignments for cable modem 104.

Figure 7:
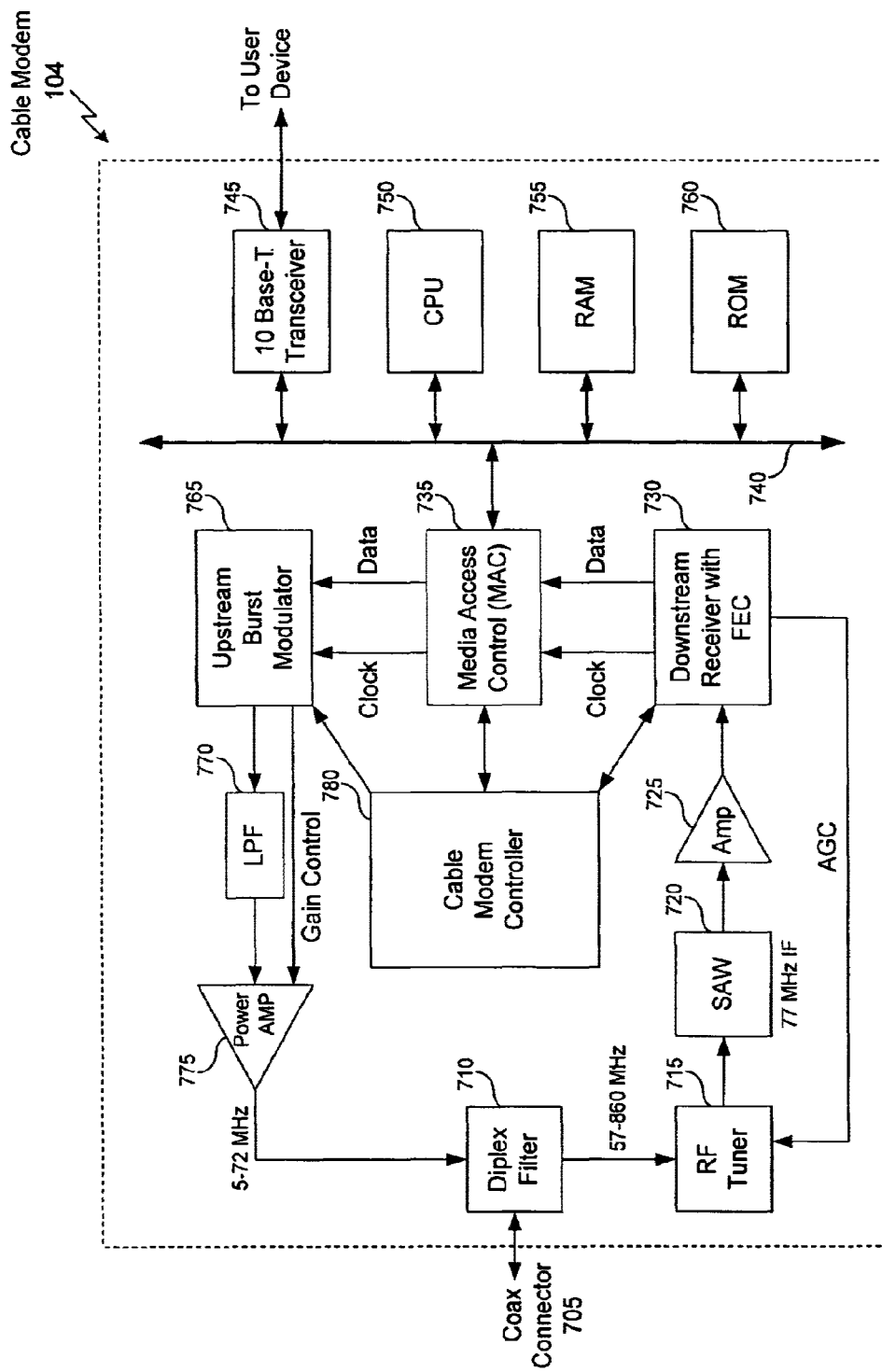
FIG. 7 illustrates a block diagram of an example implementation of the cable modem shown in FIG. 4 according to an embodiment of the present invention.

FIG. 7 illustrates a block diagram of an exemplary implementation of cable modem 104 of cable modem system 400 according to an embodiment of the present invention. This exemplary implementation is presented by way of example, and is not intended to limit the present invention. Cable modem 104 is configured to receive and transmit signals to and from communication network 406 via coaxial connector 705. Accordingly, cable modem 104 will be described in terms of a receiver portion and a transmitter portion.

The receiver portion includes a diplex filter 710, a radio frequency (RF) tuner 715, a surface acoustic wave (SAW) filter 720, an amplifier 725, and a downstream receiver 730. Reception begins with diplex filter 710 receiving a downstream signal originating from CMTS 102. Diplex filter 710 isolates the downstream signal and routes the signal to RF tuner 715. In an embodiment, the downstream signal has spectral characteristics in the frequency range of approximately 54-860 MHz. RF tuner 715 downconverts the signal and provides the downconverted signal to SAW filter 720, which passes only spectral components of the downconverted signal that are within a particular bandwidth. Amplifier 725 amplifies the filtered signal and passes it to downstream receiver 730. According to an embodiment, automatic gain controls are provided from downstream receiver 730 to RF tuner 715.

Downstream receiver 730 demodulates the amplified signal. For example, downstream receiver 730 may demodulate the amplified signal in accordance with a quadrature amplitude modulation (QAM) technique, such as 64-QAM or 256-QAM, to recover the underlying information signal. Downstream receiver 730 also converts the underlying information signal from an analog form to digital form. Downstream receiver 730 then provides the digitized underlying information to a media access control (MAC) 735.

MAC 735 processes the digital data, which may include, for example, Ethernet packets for transfer to an attached user device. The functions of MAC 735 are implemented in hardware, software, firmware, or a combination thereof. In the example implementation of FIG. 7, the functions of MAC 735 are implemented in both hardware and software. Random access memory (RAM) 755 and/or read-only memory (ROM) 760 stores software functions of MAC 735. CPU 750 executes the software functions of MAC 735. MAC 735 is in electrical communication with CPU 750, RAM 755, and ROM 760 via a shared communications medium 740. Shared communications medium 740 may include a computer bus or a multiple access data network, to provide some examples.

Referring to FIG. 7, MAC 735 is further in electrical communication with an Ethernet interface 745 via shared communications medium 740. When appropriate, MAC 735 transfers Ethernet packets received from downstream receiver 730 to Ethernet interface 745 for transfer to an attached user device.

The transmitter portion of cable modem 104 includes an upstream burst modulator 765, a low pass filter 770, a power amplifier 775, and diplex filter 710. Transmission begins with MAC 735 receiving a data packet. According to an embodiment, the data packet includes data originally received from an attached user device via Ethernet interface 745. In another embodiment, MAC 735 generates the data packet as part of the cable modem network management and upkeep. MAC 735 formats the data packet in compliance with the protocols set forth in the DOCSIS™ specification. MAC 735 provides the data packet to upstream burst modulator 765, which converts the data packet into analog form and modulates the data packet onto a carrier signal in accordance with a particular modulation technique. The modulation technique may include, without limitation, a Quadrature Phase Shift Key (QPSK) technique, an 8-QAM technique, a 16-QAM technique, a 32-QAM technique, or a 64-QAM technique, to provide some examples.

Upstream burst modulator 765 provides the modulated carrier signal to low pass filter (LPF) 770, which generally passes signals with spectral characteristics in a desired bandwidth within the frequency range of approximately 5-42 MHz. Power amplifier 775 amplifies the filtered signal received from LPF 770 and provides the amplified signal to diplex filter 710. Upstream burst modulator 765 typically regulates the gain of power amplifier 775. Diplex filter 710 isolates the amplified signal and transmits the amplified signal upstream over communication network 406 during a scheduled burst opportunity.

According to an embodiment, MAC 735 includes an upstream portion and a downstream portion. The downstream portion of MAC 735 receives grant information from downstream receiver 730 and forwards the grant information to cable modem controller 780. Cable modem controller 780 provides the grant information to upstream burst modulator 765 to configure upstream burst modulator 765 for transmission of the upstream communications. Cable modem controller 780 further provides the grant information to the upstream portion of MAC 735. For transmissions involving a plurality of upstream channels, MAC 735 facilitates bonding of the upstream channels. For example, MAC 735 may bond N upstream channels, enabling upstream burst modulator 765 to transmit at least a first portion of an upstream communication among the N upstream channels at a cumulative data rate using a cumulative average transmit power that is less than the average transmit power that would be necessary to transmit the upstream communication at the same data rate or a lower data rate using fewer upstream channels.

In another embodiment, cable modem controller 780 includes monitoring module 112, which monitors a characteristic of communication system 100. For example, cable modem controller 780 may provide information to MAC 735 and/or upstream burst modulator 765, indicating that upstream communication is to be transmitted using bonded upstream channels in response to the characteristic satisfying a condition (e.g., reaching a threshold).

Figure 8:
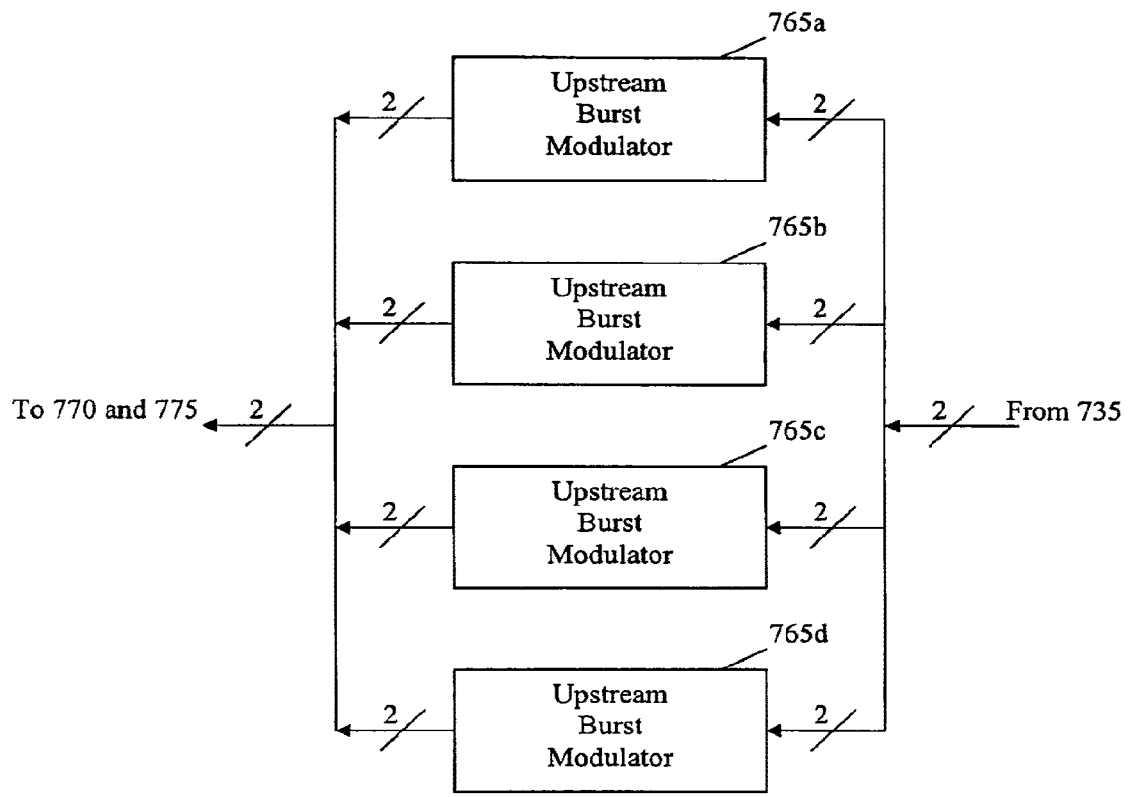
FIG. 8 illustrates an example implementation of the upstream burst modulator shown in FIG. 7 according to an embodiment of the present invention.

FIG. 8 illustrates an example implementation of upstream burst modulator 765 of FIG. 7 according to an embodiment of the present invention. In FIG. 8, upstream burst modulator 765 is implemented as a plurality of upstream burst modulators 765a-d that are coupled in parallel with each other. Each upstream burst modulator 765a-d is operated independently. For instance, network controller 694 of CMTS 102 (see FIG. 6) may allocate burst grants to respective upstream burst modulators 765a-d independently.

It should be noted that the total upstream power provided by cable modem 104 is a limited resource. Accordingly, the cumulative upstream power associated with upstream burst modulators 765a-d cannot exceed the limits of cable modem system 400. This upstream power limitation may necessitate that upstream burst modulators 765a-d be operated with some level of dependency.

2.2 Example System Performance

FIGS. 9-13 are provided to illustrate the performance of cable modem system 400 shown in FIG. 4 according to embodiments of the present invention. The performance in each figure is shown with average transmit power (P) along the Y axis and frequency (f) along the X axis. The powers shown along the Y axes are represented linearly, as opposed to the traditional logarithmic representation, to more clearly illustrate the differences between the figures. In the discussion of FIGS. 9-13, cable modem 104 is assumed to be "non-disadvantaged", i.e., capable of operating a single channel in accordance with a 64-Quadrature Amplitude Modulation (64QAM) technique. Data rates are represented as "unburdened", i.e., not including FEC parity, time guard bands, MAC, etc.

2.2.1 Single Upstream Channel

Figure 9:
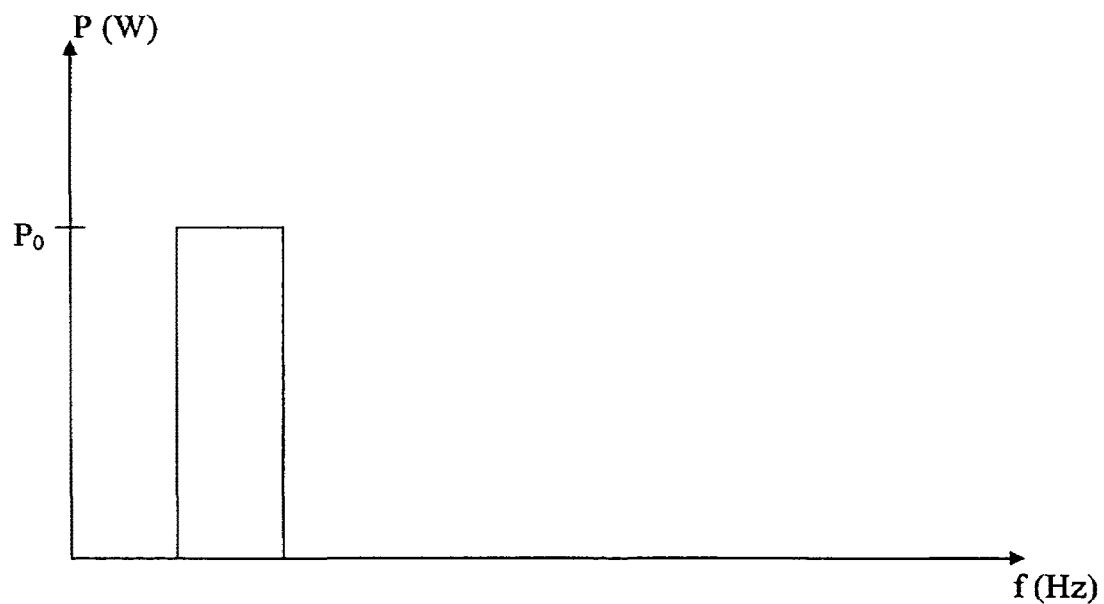
FIG. 9 illustrates the performance of the cable modem system shown in FIG. 4 using a single physical upstream channel according to an embodiment of the present invention.

FIG. 9 illustrates the performance of cable modem system 400 using a single physical upstream channel according to an embodiment of the present invention. Referring to FIG. 9, cable modem 104 transmits an upstream communication using a 64QAM technique in a single 6.4 MHz channel. Cable modem 104 utilizes an average transmit power of $P_0$. In the description of FIGS. 9-13, $P_0$=+52 dBmV for illustrative purposes. However, persons skilled in the relevant art(s) will recognize that $P_0$ may be any value. For illustrative purposes, assume that $P_0$=+52 dBmV enables cable modem 104 utilizing 64QAM to transmit 6 bits/symbol upstream. Accordingly, in the embodiment of FIG. 9, cable modem 104 provides an unburdened upstream capacity $R_9$ of approximately 30 Mbps, as shown by the following equation:

$$R_9 = 6\frac{\text{bits}}{\text{symbol}} * 5.12\frac{Msymbols/sec}{\text{channel}} * 1 \text{ channel} \approx 30 \text{ Mbps}.$$

In general, each additional 3 dB of average transmit power enables cable modem 104 to provide approximately one additional bit per symbol in an upstream transmission. Accordingly, doubling the average transmit power in FIG. 9 to $P=2*P_0$=+55 dBmV provides an unburdened upstream capacity $R_9'$ of approximately 35 Mbps, utilizing the single physical upstream channel:

$$R_9' = 7\frac{\text{bits}}{\text{symbol}} * 5.12\frac{Msymbols/sec}{\text{channel}} * 1 \text{ channel} \approx 35 \text{ Mbps}.$$

2.2.2 Two Upstream Channels

Figure 10:
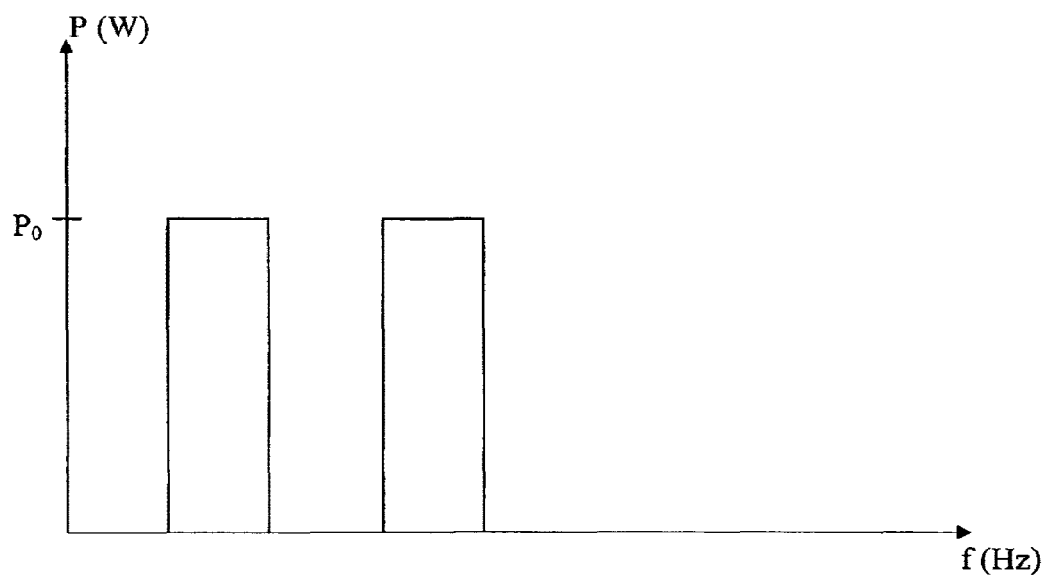
FIGS. 10-12 illustrate the performance of the cable modem system shown in FIG. 4 using two physical upstream channels according to respective embodiments of the present invention.
Figure 11:
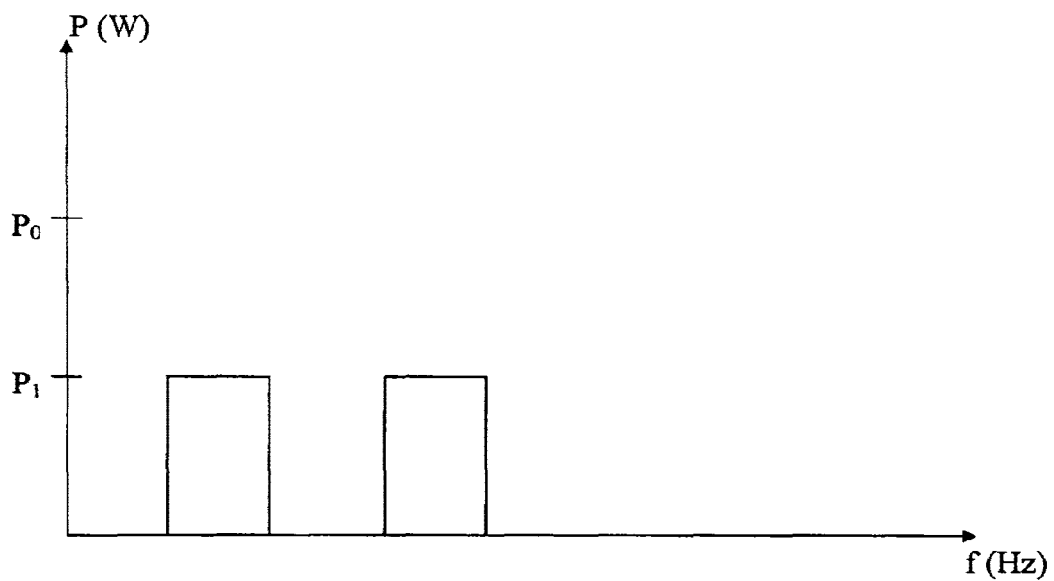
Figure 12:
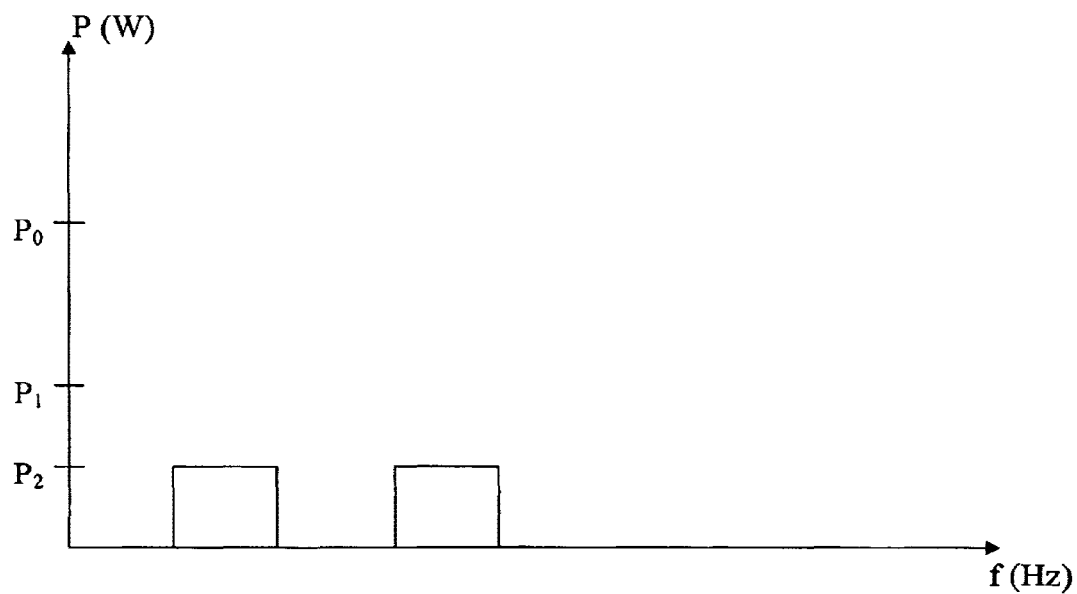

FIGS. 10-12 illustrate the performance of cable modem system 400 using two physical upstream channels according to respective embodiments of the present invention.

Referring to FIG. 10, cable modem 104 transmits an upstream communication using a 64QAM technique across two 6.4 MHz channels. Cable modem 104 utilizes an average transmit power of $P_0$ for each channel, providing a total average transmit power $P_{TOTAL}$ of $2*P_0$=+55 dBmV. Using two physical upstream channels enables cable modem 104 to transmit 2 symbols of 6 bits each simultaneously, providing an unburdened upstream capacity $R_{10}$ of approximately 60 Mbps, as shown by the following equation:

$$R_{10} = 6\frac{\text{bits}}{\text{symbol}} * 5.12\frac{Msymbols/sec}{\text{channel}} * 2 \text{ channels} \approx 60 \text{ Mbps}.$$

In this example embodiment, using two physical upstream channels provides a 25 Mbps improvement in unburdened upstream capacity, as compared to using a single physical upstream channel at the same average transmit power.

FIG. 11 shows that spreading an upstream communication among more physical upstream channels can provide a greater unburdened upstream capacity without requiring an increase of average transmit power. For example, in FIG. 11, cable modem 104 transmits an upstream communication using 32QAM across two 6.4 MHz channels. Utilizing an average transmit power of +49 dBmV for each channel (i.e., $P_{TOTAL}$=+52 dBmV) enables cable modem 104 to transmit 5 bits/symbol in each channel, providing an unburdened upstream capacity $R_{11}$ of approximately 50 Mbps:

$$R_{11} = 5\frac{\text{bits}}{\text{symbol}} * 5.12\frac{Msymbols/sec}{\text{channel}} * 2 \text{ channels} \approx 50 \text{ Mbps}.$$

Thus, using the techniques provided herein, the "non-disadvantaged" CM can almost double its upstream data rate (from approximately 30 Mbps to 50 Mbps), without requiring increased average transmit power.

Enabling one channel at 64QAM with maximum upstream transmit power, DOCSIS™ 2.0 provides approximately 30 Mbps unburdened upstream data capacity. In contrast, according to the techniques described herein, enabling two 5 bits/symbol channels with the same total power provides approximately 50 Mbps unburdened upstream capacity. Note that an additional 3 dB of transmit power capability would only provide an additional 10 Mbps (from 50 to 60 Mbps) of capacity in the two channels. For a single cable modem, once a high SNR is reached, spreading energy over more bandwidth or dimensions provides higher capacity than concentrating more energy in fewer dimensions. For example, an embodiment that utilizes four physical upstream channels to provide even higher capacity is discussed below with reference to FIG. 13, following the discussion of FIG. 12.

FIG. 12 shows that spreading an upstream communication among more physical upstream channels can provide a greater unburdened upstream capacity at a lower average transmit power. Referring to FIG. 12, cable modem 104 transmits an upstream communication using 16QAM across two 6.4 MHz channels. Utilizing an average transmit power of +46 dBmV for each channel (i.e., $P_{TOTAL}$=+49 dBmV) enables cable modem 104 to transmit 4 bits/symbol in each channel, providing an unburdened upstream capacity $R_{12}$ of approximately 40 Mbps:

$$R_{12} = 4\frac{\text{bits}}{\text{symbol}} * 5.12\frac{Msymbols/sec}{\text{channel}} * 2 \text{ channels} \approx 40 \text{ Mbps}.$$

As compared to the single physical upstream channel embodiment described above with respect to FIG. 9, the embodiment of FIG. 12 provides a greater upstream data rate (40 Mbps versus 30 Mbps), even though the embodiment of FIG. 9 requires more average transmit power (52 dBmV versus 49 dBmV).

If other cable modems can operate on the two physical upstream channels using a 64QAM technique because they have less insertion loss to the upstream receiver, then cable modem system 400 may lose some capacity by allocating approximately 12 MHz of channels for 16QAM operation (as opposed to 64QAM operation), even though the above usage scheme may optimize the upstream bursting communications for cable modem 104. This is one "cost" imposed upon cable modem system 400 for giving power-limited cable modems higher burst rate and for not burdening every cable modem with a higher cost for peak power. By allowing the two physical upstream channels to be used in 64QAM mode when other users with less insertion loss up to the receiver are transmitting via logical channels, additional burst profiles, etc., cable modem system 400 reduces the lost capacity in those channels.

2.2.3 Four Upstream Channels

Figure 13:
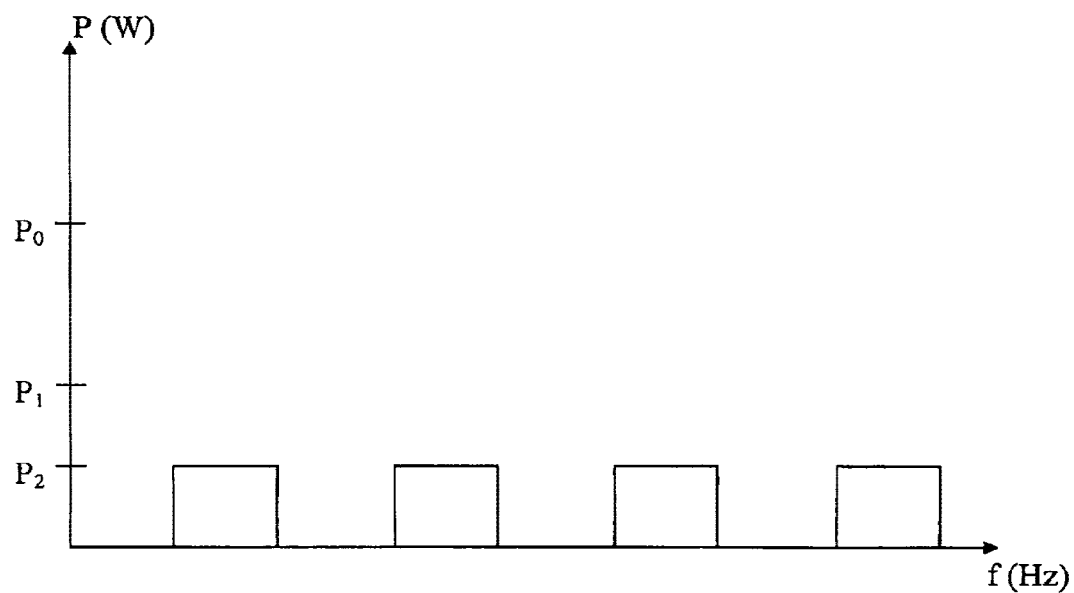
FIG. 13 illustrates the performance of the cable modem system shown in FIG. 4 using four physical upstream channels according to an embodiment of the present invention.

FIG. 13 illustrates the performance of cable modem system 400 using four physical upstream channel according to an embodiment of the present invention. In the embodiment of FIG. 13, cable modem 104 transmits an upstream communication using a 16QAM technique across four 6.4 MHz channels. Cable modem 104 utilizes +46 dBmV of average transmit power for each channel, providing a total average transmit power $P_{TOTAL}$ of +52 dBmV. Cable modem 104 transmits 4 bits/symbol in each channel, providing an unburdened upstream capacity $R_{13}$ of approximately 80 Mbps:

$$R_{13} = 4 \frac{\text{bits}}{\text{symbol}} * 5.12 \frac{\text{Msymbols/sec}}{\text{channel}} * 4 \text{ channels} \approx 80 \text{ Mbps}.$$

Utilizing four physical upstream channels enables cable modem 104 to more than double the unburdened upstream capacity described with respect to the single physical upstream channel embodiment of FIG. 9 without increasing the required average transmit power.

Operating cable modem 104 in four 6.4 MHz upstream channels introduces a "cost" to cable modem system 400, because cable modem 104 is using the upstream channels at 16QAM when other cable modems may be able to transmit in those channels using more power (especially if only using one of them) and achieve more bits/sec per Hz in overall upstream capacity for cable modem system 400.

Out-of-band spurious performance is another consideration. Increasing the maximum average transmit power of cable modems runs counter to tightening the out-of-band spurious requirements, which facilitates total upstream system capacity by preserving channels for high density operation. For example, it may not be desirous for DOCSIS™ transmitters to raise the noise floor of clean channels, which would otherwise support 256QAM. Supporting 256QAM likely will provide greater total network capacity than will enabling a few weak modems with a dozen or so more Mbps at the expense of increased cost for all cable modems and more out-of-band spurious energy.

In other words, allocating a high burst rate in too few channels (e.g., a single channel) can "cost" cable modem system 400 in terms of total throughput. It may not be desirous for a "disadvantaged" cable modem (i.e., a cable modem with a large insertion loss to upstream receiver) to be empowered with more transmit power at the increased cost of all cable modems in order to realize a minimal benefit in its upstream throughput. "Non-disadvantaged" cable modems, however, do not need more transmit power to realize substantial increases in throughput when more bandwidth (e.g., more channels) is available.

A "disadvantaged" cable modem, supporting two upstream channels, both at maximum average transmit power, is counter to the more efficient approach of using fewer spreading codes for disadvantaged users afforded by SCDMA (or more narrow channel bandwidth for TDMA users). On the other hand, for a "non-disadvantaged" cable modem, which is capable of operating a single channel in 64QAM, supporting two channels upstream at the existing total maximum transmit power provides almost a doubling of the upstream data rate, without requiring any more maximum transmit power or burdening the upstream system (e.g., lasers, etc.) with carrying more power.

Thus, supporting two channels from a single cable modem, both at maximum transmit power, may not be the best use of system resources when cable modem cost and cable modem upstream burst capacity are the priorities. Unlike "non-disadvantaged" cable modems, which benefit greatly from more bandwidth, "disadvantaged" cable modems probably should not be using more bandwidth (i.e., they should be operating within one channel).

Furthermore, the overall system noise floor, which supports high density modulations, probably should not be raised due to increased spurious emissions, thus acting to limit increased transmit power. Additionally, improved impairment mitigation techniques reduce the pressure for higher transmit power. For example, impairment mitigation techniques (e.g., echoes, ingress, burst noise, etc.) have reached a level where 256QAM performance is feasible in channels with low AWGN noise floor. By using impairment mitigation techniques in conjunction with SCDMA reduced code sets, even disadvantaged cable modems can operate upstream better than DOCSIS™ 2.0 cable modems currently can, mitigating the need for increasing the transmit power for a two channel device by 3 dB.

Also, a cable modem requiring peak power for QPSK operation does not operate near the high end goals of DOCSIS™ 3.0, so burdening cable modem 104 with 12.4 MHz allocated to the associated under-achieving user may be inefficient. This user (in terms of DOCSIS™ 3.0 capabilities) should be considered as disadvantaged (as are users in DOCSIS™ 2.0 that cannot operate using a QPSK technique in 6.4 MHz channels even at peak power), and probably should not run up the cost for all cable modems and impair the entire upstream spectrum at the same time.

With real world impairments in addition to AWGN, the change in capacity provided by an additional 3 dB of average transmit power may differ from one bit per symbol, which typically occurs with AWGN and relatively high density modulations, maintaining an acceptable error rate. Generally, with high density, high capacity modulations, if the benefit of additional average transmit power is less than a given value (e.g., approximately ⅔ bit per symbol per dB), then it may be better to spread the average transmit power among more channels.

In an embodiment, cable modem system 400 is capable of determining the capacity versus average transmit power sensitivity for each channel and increasing/decreasing the average transmit power among the plurality of physical upstream channels accordingly. For example, monitoring module 112 may monitor the capacity and the average transmit power to determine the sensitivity for each channel. In this example, upstream burst modulator 765 and/or power amplifier 775 may increase/decrease the average transmit power among the plurality of physical upstream channels.

3.0 Other Embodiments

FIGS. 1-13 are conceptual illustrations allowing an easy explanation of transmitting information among a plurality of physical upstream channels. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail may be made therein without departing from the spirit and scope of the invention. Moreover, it should be understood that the method, system, and computer program product of the present invention could be implemented in any multi-nodal communication environment governed by centralized nodes. The nodes include, but are not limited to, cable modems, set-top boxes, and headends, as well as communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. An apparatus comprising:
    at least one communication interface configured to:
        support communication with at least one additional apparatus via at least one of a plurality of communication channels; and
        transmit a first portion of data via a first plurality of communication channels based on a first number of bits per symbol and a first power; and
        transmit a second portion of data that includes a same amount of data as the first portion of data, using less power than used to transmit the first portion of data, via a second plurality of communication channels that is different than the first plurality of communication channels and that includes at least one more channel than the first plurality of communication channels and based on a second number of bits per symbol that is different than the first number of bits per symbol and also based on a second power that is different than the first power.

2. The apparatus of claim 1 further comprising:
    a cable modem, wherein the at least one additional apparatus is a cable modem termination system (CMTS).

3. The apparatus of claim 1 further comprising:
    a cable modem termination system (CMTS), wherein the at least one additional apparatus is a cable modem.

4. The apparatus of claim 1, wherein the second at least one of the plurality of communication channels to support a different data rate than the first at least one of the plurality of communication channels.

5. The apparatus of claim 1, wherein at least one of the second plurality of communication channels to support a different number of bits per symbol than at least one of the first plurality of communication channels.

6. The apparatus of claim 1 further comprising:
    a communication device that is operative within a cable communication system that includes at least one of a cable modem, a cable modem termination system (CMTS), and a cable headend.

7. An apparatus comprising:
    at least one communication interface configured to:
        support communication with at least one additional apparatus via at least one of a plurality of communication channels; and
        transmit a first portion of data via a first at least one of the plurality of communication channels based on a first power; and
        transmit a second portion of data that includes more data than the first portion of data, using a same amount of power as used to transmit the first portion of data, via a second at least one of the plurality of communication channels that includes a different number of channels than the first at least one of the plurality of communication channels and that includes at least one more channel than the first plurality of communication channels and based on a second power that is different than the first power.

8. The apparatus of claim 7 further comprising:
    a cable modem, wherein the at least one additional apparatus is a cable modem termination system (CMTS).

9. The apparatus of claim 7 further comprising:
    a cable modem termination system (CMTS), wherein the at least one additional apparatus is a cable modem.

10. The apparatus of claim 7, where the second at least one of the plurality of communication channels to support a different data rate than the first at least one of the plurality of communication channels.

11. The apparatus of claim 7 further comprising:
    when the at least one communication interface configured to transmit the second portion of data via the second at least one of the plurality of communication channels, the apparatus configured to lower a number of bits per symbol within the first at least one of the plurality of communication channel.

12. The apparatus of claim 7, wherein the second at least one of the plurality of communication channels to support a different number of bits per symbol than the first at least one of the plurality of communication channels.

13. The apparatus of claim 7 further comprising:
the at least one communication interface configured to transmit a third portion of data via a third at least one of the plurality of communication channels that includes a different number of channels than the second at least one of the plurality of communication channels wherein, the third at least one of the plurality of communication channels support a different number of bits per symbol than the second at least one of the plurality of communication channels.

14. The apparatus of claim 7 further comprising:
a communication device that is operative within a cable communication system that includes at least one of a cable modem, a cable modem termination system (CMTS), and a cable headend.

15. A method for execution by a communication device, the method comprising:
operating at least one communication interface to support communication with at least one additional communication device via at least one of a plurality of communication channels;
transmitting a first portion of data via a first at least one of the plurality of communication channels based on a first power; and
transmitting a second portion of data that includes more data than the first portion of data, using less power than used for transmitting the first portion of data, via a second at least one of the plurality of communication channels that includes a different number of channels than the first at least one of the plurality of communication channels and that includes at least one more channel than the first plurality of communication channels and based on a second power that is different than the first power.

16. The method of claim 15, wherein the communication device is a cable modem, and the at least one additional communication device is a cable modem termination system (CMTS).

17. The method of claim 15, wherein the communication device is a cable modem termination system (CMTS), and the at least one additional communication device is a cable modem.

18. The method of claim 15 further comprising:
operating the second at least one of the plurality of communication channels to support a different data rate than the first at least one of the plurality of communication channels.

19. The method of claim 15 further comprising:
operating the second at least one of the plurality of communication channels to support a different number of bits per symbol than the first at least one of the plurality of communication channels.

20. The method of claim 15, wherein the communication device is operative within a cable communication system that includes at least one of a cable modem, a cable modem termination system (CMTS), and a cable headend.

* * * * *